(12) United States Patent
Yumi et al.

(10) Patent No.: US 8,974,165 B2
(45) Date of Patent: Mar. 10, 2015

(54) SCREW

(71) Applicant: Kitagawa Industries Co., Ltd., Inazawa-shi, Aichi (JP)

(72) Inventors: Hideo Yumi, Inazawa (JP); Yasuo Kondo, Inazawa (JP); Makoto Kato, Inazawa (JP)

(73) Assignee: Kitagawa Industries Co., Ltd., Inazawa-Shi, Aich (JP)

( * ) Notice: Subject to any disclaimer, the term of this patent is extended or adjusted under 35 U.S.C. 154(b) by 0 days.

(21) Appl. No.: 14/074,813

(22) Filed: Nov. 8, 2013

(65) Prior Publication Data
US 2014/0133936 A1 May 15, 2014

(30) Foreign Application Priority Data

Nov. 12, 2012 (JP) .................................. 2012-248604
Aug. 5, 2013 (JP) .................................. 2013-162314

(51) Int. Cl.
*F16B 35/04* (2006.01)
*F16B 33/00* (2006.01)

(52) U.S. Cl.
CPC ............ *F16B 33/006* (2013.01); *Y10S 411/903* (2013.01); *Y10S 411/908* (2013.01)
USPC .................... 411/424; 411/903; 411/908

(58) Field of Classification Search
USPC .......... 411/378, 411, 424, 900, 903–905, 908
See application file for complete search history.

(56) References Cited

U.S. PATENT DOCUMENTS

| | | | | | |
|---|---|---|---|---|---|
| 2,949,054 | A | * | 8/1960 | White | 411/418 |
| 3,485,132 | A | * | 12/1969 | Hanny et al. | 411/548 |
| 4,623,290 | A | * | 11/1986 | Kikuzawa et al. | 411/350 |
| 4,863,330 | A | * | 9/1989 | Olez et al. | 411/424 |
| 5,080,547 | A | * | 1/1992 | Moghe | 411/436 |
| 5,092,727 | A | * | 3/1992 | Moghe | 411/411 |
| 5,114,290 | A | * | 5/1992 | Moghe | 411/411 |
| 5,127,783 | A | * | 7/1992 | Moghe et al. | 411/411 |
| 5,152,650 | A | * | 10/1992 | Kitagawa | 411/82.5 |

FOREIGN PATENT DOCUMENTS

JP H04-153228 A 5/1992

* cited by examiner

*Primary Examiner* — Roberta Delisle
(74) *Attorney, Agent, or Firm* — Davis & Bujold, PLLC; Michael J. Bujold

(57) ABSTRACT

A screw has an outer diameter in a range of 0.3 mm to 1.4 mm. The screw includes resin and carbon fiber which is dispersed in the resin and has a fiber diameter in a range of 0.01 μm to 0.20 μm.

13 Claims, 4 Drawing Sheets

FIG. 5A (×500)
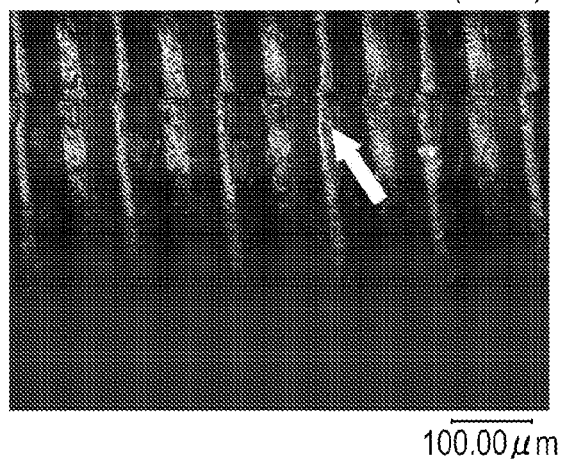
100.00 μm
FIG. 5B (×1000)
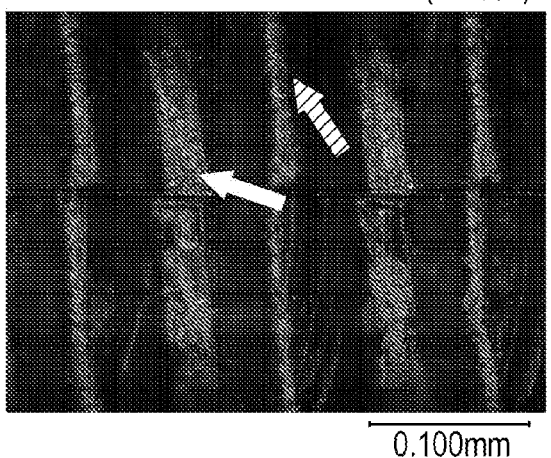
0.100mm
FIG. 5C (×1000, INCLINED AT 30 DEGREES)
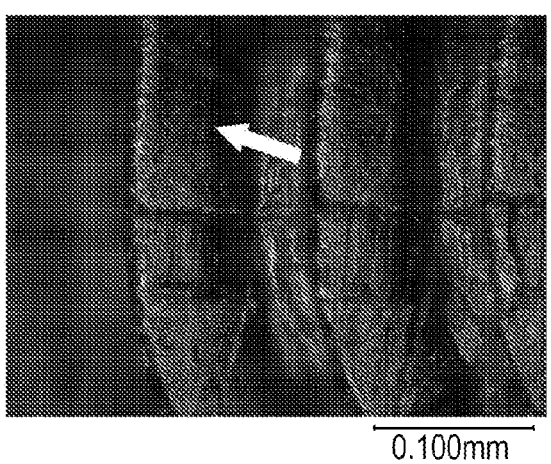
0.100mm 100.00μm

SCREW

CROSS-REFERENCE TO RELATED APPLICATION

This application is based on Japanese Patent Application No. 2012-248604 filed with the Japan Patent Office on Nov. 12, 2012 and Japanese Patent Application No. 2013-162314 filed with the Japan Patent Office on Aug. 5, 2013, the entire contents of which are hereby incorporated by reference,

BACKGROUND

1. Technical Field

This disclosure relates to screws, and in particular, to a minute screw having an outer diameter in a range of 0.3 mm to 1.4 mm.

2. Related Art

In recent years, there is a growing need for minute screws in the fields of devices such as medical equipment, watches, and glasses. In particular, in order to reduce the weights of products, minute screws made of resin are needed (see JP-A-04-153228).

SUMMARY

A screw has an outer diameter in a range of 0.3 mm to 1.4 mm. The screw includes resin and carbon fiber which is dispersed in the resin and has a fiber diameter in a range of 0.01 µm to 0.20 µm.

BRIEF DESCRIPTION OF DRAWINGS

FIGS. 5A, 5B, and 5C are photographs of screws taken with a digital microscope, in which FIG. 5A is a photograph taken at a magnification of 500 times, FIG. 5B is a photograph taken at a magnification of 1,000 times, and FIG. 5C is a photograph taken at a magnification of 1,000 times with a sample inclined at 30 degrees.

DETAILED DESCRIPTION

Figure 1:
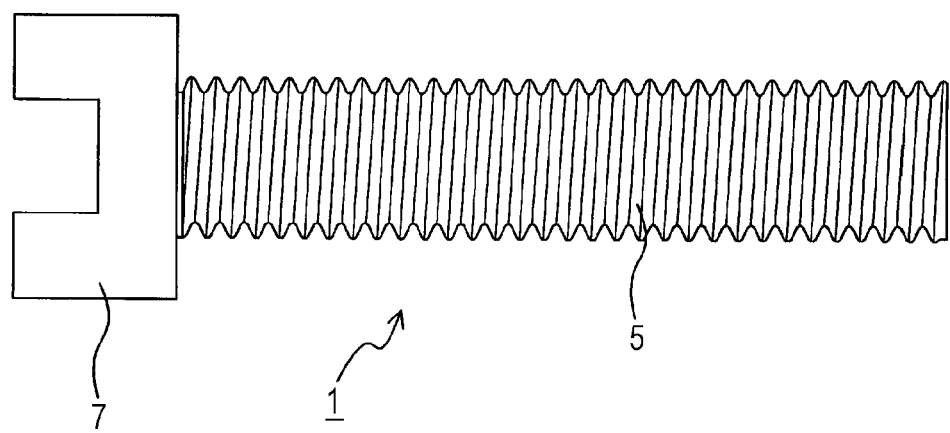
FIG. 1 is a side view illustrating the shape of a screw.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

A conventional minute screw made of resin has no sufficient strength. An object of this disclosure is to provide a screw having high strength.

According to a first aspect of the present disclosure, a screw (the present screw) has an outer diameter in a range of 0.3 mm to 1.4 mm, and includes resin and carbon fiber having a fiber diameter in a range of 0.01 µm to 20 µm and being dispersed in the resin.

The present screw is lightweight and has high strength. In the present screw, it is preferable that the carbon fiber have a fiber length of 10 µm to 20 µm. In this case, the present screw has higher strength.

In addition, the screw of this disclosure includes resin. Preferably, the screw of this disclosure is substantially free of any metal. Thus, the present screw has advantages in that it is prevented from being rusted and magnetized, and prevented from causing any metallic allergy, when compared to metal screws.

In the present screw, the carbon fiber has a fiber diameter of 0.01 µm or greater. Thus, the resin including carbon fiber is unlikely to result in excessive viscosity. Also, the carbon fiber has a fiber diameter of 0.2 µm or less. Thus, the carbon fiber is allowed to be filled in resin at a high density. Accordingly, formation of the resin including carbon fiber is facilitated.

The carbon fiber in the present screw may be, for example, vapor-grown carbon fiber (VGCF). In the present screw, a preferable content of the carbon fiber is in a range of 1% by weight to 15% by weight of the resin. The screw has therefore higher strength.

An embodiment of this disclosure is described in the following. In this embodiment, a screw represents an external screw. An outer diameter of the screw represents an outer diameter d prescribed in the Japan Industrial Standards (JIS) B 0201-1973. The screw according to this embodiment (the present screw) has a thread height in a range of, for example, 20 µm to 90 µm.

Note that a thread height h is represented with a thread outer diameter d, and a core diameter $d_1$, as follows:

$$h = (d - d_1)/2$$

where $d_1$ represents the diameter of the core of an external screw that is prescribed in JIS B 0201-1973.

The present screw has a pitch in a range of, for example, 0.05 mm to 0.5 mm, axial length of the body (axle part) of the present screw except its screw head is in a range of, for example, 0.4 mm to 5 mm.

The carbon fiber may be, for example, VGCF. Alternatively, the carbon fiber may be any type of carbon fiber other than VGCF. The carbon fiber has a fiber diameter in a range of for example, 0.01 mm to 0.2 µm. The fiber diameter of the carbon fiber can be determined by, for example, a technique of photographing the carbon fiber using an electron microscope or the like and calculating the diameter of the carbon fiber using the obtained photograph. Alternatively, using the above technique, the average fiber diameter of the carbon fiber may be determined by, for example, calculating the diameters of the respective carbon fiber threads in sufficient number (for example, several tens to several thousands thereof), and calculating the average of the diameters.

The average fiber length of the carbon fiber can be obtained by, for example, measuring longitudinal fiber lengths of the respective carbon fiber threads in sufficient number (for example, several tens to several thousands thereof), and calculating the average of the longitudinal lengths.

The VGCF used herein may be commercially available from Showa Denko K.K. under the trade name "VGCF-H". VGCF-H has an average fiber diameter of 150 nm (0.15 µm). VGCH-H has a fiber length of 10 µm to 20 µm.

In this disclosure, examples of the resin may include, but not specifically limited to, polycarbonate, polyether etherketone, and polyphenylene sulfide.

A method for producing the present screw may include making a molding material by kneading resin and carbon fiber using a twin extruder or the like, and producing a screw by an injection molding process using a molding material.

Example

(1) Production of Screw

Ninety parts by weight of polycarbonate resin having a viscosity average molecular weight of 20200, and 10 parts by weight of VGCF having an average fiber diameter of 150 nm, a fiber length of 10 μm to 20 μm, and a bulk density of 0.07 g/cm$^3$ were respectively weighed. The resin and the VGCF were kneaded and extruded into strands of 3 mm in diameter using a twin extruder at 280° C. The resulting strands were pelletized to obtain a molding material. Here, the polycarbonate resin used was "CALIBRE 301-15" manufactured by Sumika Styron Polycarbonate Limited. The VGCF used was "VGCF-H" manufactured by Showa Denko K.K., which was pre-heated at 2,800° C.

The molding material was fed into an injection molding machine from its material inlet. The material was plasticized at cylinder temperatures in the order of 277° C., 280° C., 270° C., and 250° C. The plasticized material was injected into a mold at an injection pressure of 141 MPa and an injection rate of 120 mm/s. The temperature of the mold was set to 80° C. The mold was cooled for a predetermined time and then opened. The molded product was ejected from the mold using an ejector pin. The molded product was placed in a plastic container.

Figure 3:
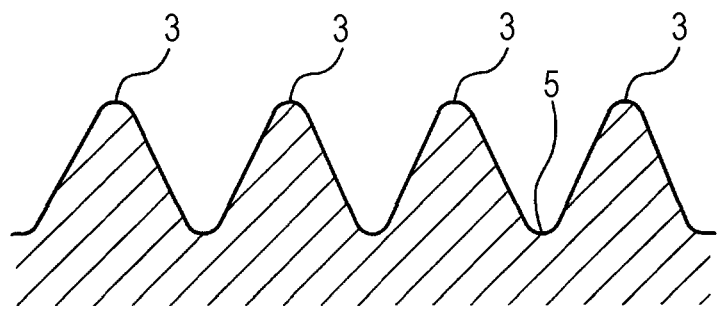
FIG. 3 is a partially enlarged view illustrating the shape of a screw.

The molded product is a screw in compliance with JIS B 0123, S0.5. The shape of the screw produced is illustrated in FIGS. 1 and 3. A screw 1 illustrated in FIGS. 1 and 3 is an example of the present screw. The screw 1 includes a substantially rod-shaped body 5 and a head 7. The body 5 has an external screw thread 3 formed in its outer peripheral surface. The screw 1 is 0.5 mm in outer diameter, 0.06 mm in a screw thread height, and 2 mm in body length.

(2) Evaluation of Screw

The screw 1 produced in this example was observed and photographed using a digital microscope manufactured by Keyence Corporation. The obtained photographs are shown in FIGS. 5A, 5B and 5C. As shown in the photographs, VGCFs uniformly fill the roots (indicated by the hatched arrow in FIG. 5B) of the screw threads 3 as well as the crests (indicated by the blank arrow in each photograph) of the screw threads 3, thereby enhancing the strength of the screw thread 3. In addition, the screw 1 produced in this example is excellent in bend strength.

Comparative Example 1

A screw was produced in a manner basically similar to the above example, except that pitch-based carbon fiber ("DIALEAD K223SE", manufactured by Mitsubishi Plastics, Inc.) was used in the same amount instead of VGCF. The pitch-based carbon fiber had a fiber diameter in a range of 11 μm to 13 μm and an average fiber length of 6 mm.

Figure 4:
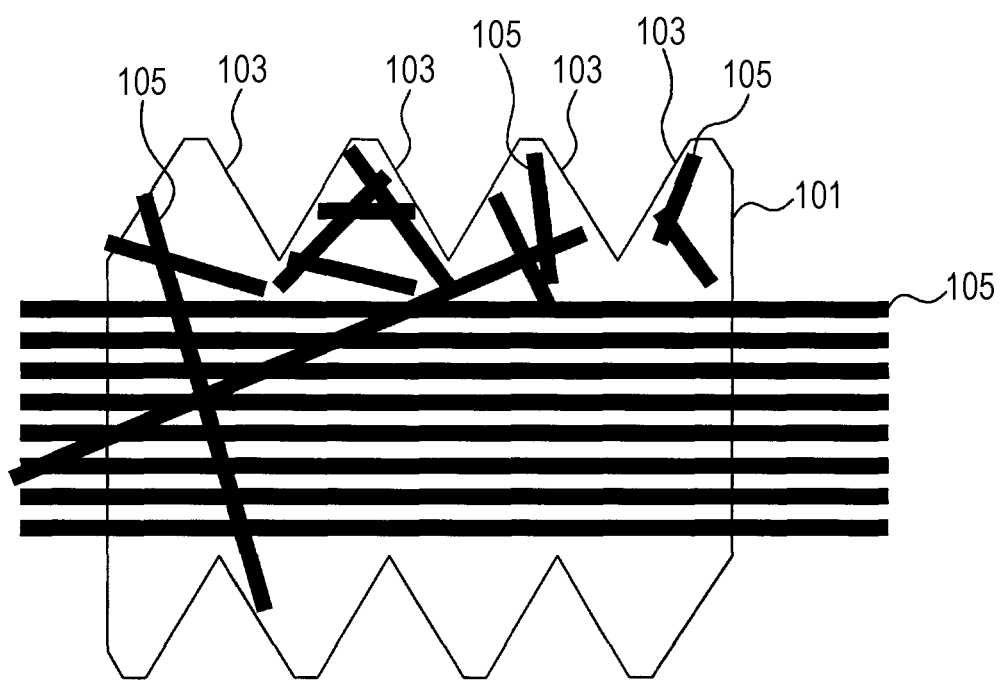
FIG. 4 is a schematic diagram illustrating a state of pitch-based carbon fiber in comparative example 1.
Figure 6:
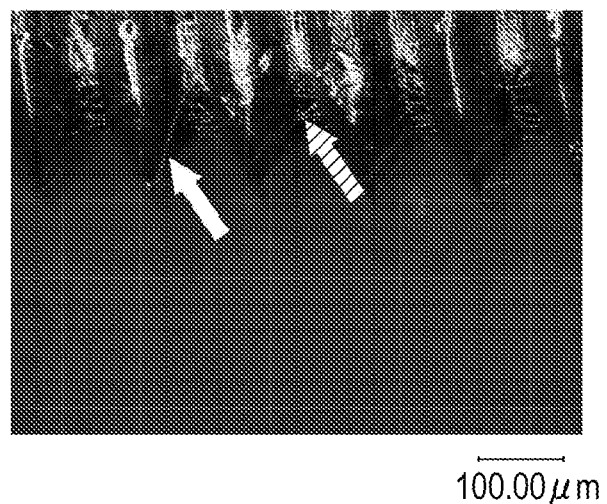
FIG. 6 is a screw photograph taken at a magnification of 500 times by using the digital microscope.

The produced screw was observed and photographed using the digital microscope manufactured by Keyence Corporation. The obtained photograph is shown in FIG. 6. As shown in FIG. 6, carbon fibers were found in the roots (indicated by the hatched arrow in the photograph) of screw threads. However, substantially no carbon fiber was filled in the crests (indicated by the blank arrow in the photograph) of the screw threads. As illustrated in FIG. 4, this is presumably because, in the screw (denoted by reference numeral 101) in comparative example 1, the fiber diameter and fiber length of carbon fiber 105 were markedly greater than dimensions (height and width) of a screw thread 103. The screw thread 103 with the carbon fibers 105 not filled therein had a low strength.

Comparative Example 2

A screw was produced in a manner basically similar to the above example, except that pan-derived carbon fiber ("TORAYCA T008" manufactured by Toray industries, Inc.) was used in the same amount instead of VGCF. The pan-derived carbon fiber had an average fiber diameter of 7 μm and a fiber length in a range of 3 μm to 12 μm.

The produced screw was tested in a manner similar to comparative example 1. The results of the test indicated that a screw thread was filled with no carbon fiber. This is presumably because, similarly to comparative example 1, the fiber diameter and fiber length of the carbon fiber were markedly greater than the dimensions of the screw thread. The screw thread with the carbon fiber not filled therein had low strength.

Comparative Example 3

A screw was produced in a manner basically similar to the above example, except that single-walled carbon nanotube ("SWNT APJ" manufactured by Meijo Nano Carbon Co., Ltd.) in the same amount instead of VGCF. The produced screw had an average fiber diameter of 1.4 nm and a fiber length in a range of 1 μm to 5 μm.

The produced screw had bend strength lower than that of the screw 1 according to the above example. This is presumably because the single-walled carbon nanotube filled in the screw had small dimensions (fiber diameter and fiber length).

In addition, in comparative example 3, a molding material had a low fluidity, resulting in a difficult molding process. This is presumably because the carbon fiber had a large specific surface area.

Note that this disclosure is not limited to the above example at all. Obviously, this disclosure may be worked in various forms without departing from the scope of this disclosure.

Figure 2:
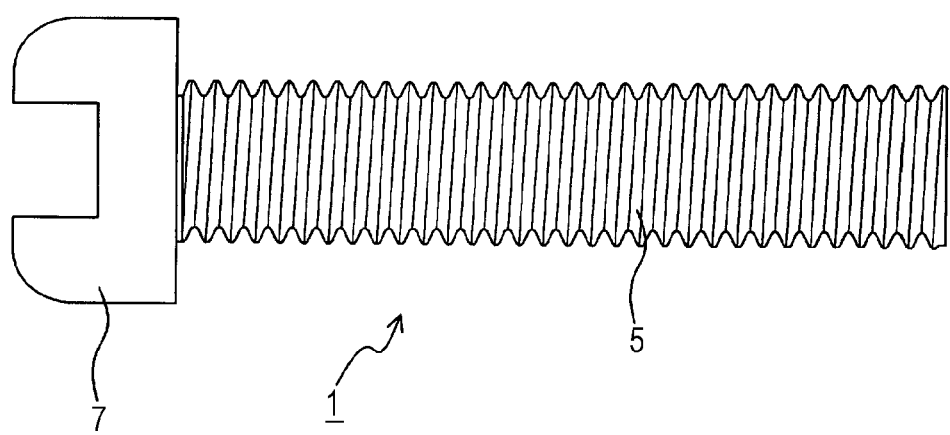
FIG. 2 is a side view illustrating the shape of a screw in another form.

For example, the screw 1 may have a shape as illustrated in FIG. 2.

In addition, even if the screw 1 has an outer diameter of 0.3 mm or 1.4 mm, it has substantially similar advantages.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:
1. A screw comprising:
resin;
carbon fiber which is dispersed in the resin and has a fiber diameter in a range of 0.01 um to 0.20 μm;
wherein the screw has an outer diameter in a range of 0.3 mm to 1.4 mm;
the carbon fiber has a fiber length of 10 μm to 20 μm;
the carbon fiber is vapor-grown carbon fiber; and
the carbon fiber has a content of 1 to 15% by weight of the resin.

2. The screw according to claim 1, wherein the resin is one of polycarbonate, polyether etherketone and polyphenylene sulfide.

3. The screw according to claim 1, wherein the screw has an elongate portion with a body length in a range of 0.4 mm to 5 mm.

4. The screw according to claim 1, wherein the screw has an elongate portion with a body length of 2 mm, the outer diameter of 0.5 mm, and a thread height of 0.06 mm.

5. The screw according to claim 1, wherein the carbon fiber uniformly fills in a thread having a plurality of thread crests and a plurality of thread roots.

6. The screw according to claim 5, wherein the screw further comprises a ratio of the fiber length to the outer diameter of the screw, where the ratio is 1/15 to 1/140 so as to improve a strength of each of the plurality of thread crests and a bend strength of the screw.

7. The screw according to claim 1, wherein the screw further comprises:
- a thread which has a plurality of thread crests arranged along an elongate portion of a body of the screw, and the carbon fiber is dispersed through out each of the plurality of thread crests;
- the thread has a thread height in a range from 20 μm to 90 μm; and
- the fiber length is between one ninth of the thread height so as to improve a strength of each of the plurality of thread crests.

8. A minute screw comprising:
a body having a head at a first end thereof;
a screw thread formed along an outer surface of an elongate portion of the body;
the screw thread forming a plurality of thread peaks and roots along the elongate portion in a longitudinal direction;
the body, the head, and the screw thread being uniformly formed from a molded resin having carbon fibers kneaded and evenly dispersed into the resin;
the minute screw having an outer diameter of between 300 μm and 1,400 μm;
the carbon fiber having a fiber length of between 10 μm and 20 μm;
the plurality of thread peaks each has a thread height of between 20 μm and 90 μm;
the fiber length being between one and one ninth the thread height so as to improve a strength of each of the plurality of thread peaks; and
a ratio of the fiber length to the outer diameter of the screw is 1/15 to 1/140 so as to improve a bend strength of the screw.

9. The screw according to claim 8, wherein the carbon fiber is a pan-derived carbon fiber which has a fiber diameter of 7 μm and a fiber length of between 3 μm and 12 μm.

10. The screw according to claim 8, wherein the carbon fiber is a vapor-grown carbon fiber which has a fiber diameter of 7 μm and a fiber length of between 0.01 μm and 20 μm.

11. The screw according to claim 8, wherein a pitch of the screw is between 0.05 mm and 0.5 mm.

12. The screw according to claim 8, wherein a length of the elongate portion of the body is between 0.4 mm and 5 mm.

13. The screw according to claim 8, wherein the screw has a carbon fiber content of 1 to 15% by weight of the resin.

* * * * *